(12) United States Patent
Amano (10) Patent No.: US 9,403,407 B2
(45) Date of Patent: Aug. 2, 2016

(54) TIRE AND TIRE FORMING MOLD (71) Applicant: BRIDGESTONE CORPORATION, Chuo-ku, Tokyo (JP)

(72) Inventor: Masakazu Amano, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 91 days.

(21) Appl. No.: 14/363,860

(22) PCT Filed: Dec. 28, 2012

(86) PCT No.: PCT/JP2012/084302
§ 371 (c)(1),
(2) Date: Jun. 9, 2014

(87) PCT Pub. No.: WO2013/100195
PCT Pub. Date: Jul. 4, 2013

(65) Prior Publication Data
US 2014/0345765 A1    Nov. 27, 2014

(30) Foreign Application Priority Data

Dec. 28, 2011  (JP) .................................. 2011-289216

(51) Int. Cl.
*B60C 11/00* (2006.01)
*B29C 33/42* (2006.01)
(Continued)

(52) U.S. Cl.
CPC ............ *B60C 11/00* (2013.01); *B29D 30/0606* (2013.01); *B29C 33/424* (2013.01);
(Continued)

(58) Field of Classification Search
CPC ................. B60C 11/00; B60C 11/008; B60C 2011/0016; B60C 11/0083; B60C 11/14; B60C 2011/142; B60C 2011/145; B60C 1/0016; B29C 33/42; B29C 33/424; B29D 30/00; B29D 30/06; B29D 30/0601; B29D 2030/0612; B29D 2030/0616; B29L 2030/00; B29L 2030/002
USPC .......... 152/209.1, 209.15, 905; 264/506, 326, 264/328.3; 425/28.1
See application file for complete search history.

(56) References Cited

U.S. PATENT DOCUMENTS

| 6,575,215 B1 * | 6/2003 | Hino ..................... B29C 43/24 |
| | | 152/209.15 |
| 2007/0006954 A1 | 1/2007 | Tsubono et al. |

(Continued)

FOREIGN PATENT DOCUMENTS

| CN | 100443315 C | 12/2008 |
| CN | 101372194 A | 2/2009 |

(Continued)

OTHER PUBLICATIONS

Basic surface texture parameters and curves, Accretech, Tokyo Seimitsu, 2016, pp. 232, 235. Retrieved from https://static1.squarespace.com/static/5155d3e7e4b01a74bb7d1208/t/56c0c7e960b5e9bcb0044108/1455474673174/SurfaceFinishExplain+-+Accretech.pdf.*

(Continued)

*Primary Examiner* — Eric Hug
(74) *Attorney, Agent, or Firm* — Sughrue Mion, PLLC (57) ABSTRACT

A tire of the present invention has a roughness motif maximum length A in a predetermined range on at least a part of the tread surface. In addition, a tire forming mold of the present invention has a roughness motif maximum length A in a predetermined range on at least a part of the tread-surface molding surface.

10 Claims, 7 Drawing Sheets (51) Int. Cl.
*B29D 30/06* (2006.01)
*B29L 30/00* (2006.01)

(52) U.S. Cl.
CPC . *B29D2030/0612* (2013.01); *B29D 2030/0616* (2013.01); *B29K 2995/0074* (2013.01); *B29L 2030/00* (2013.01); *B60C 2011/0016* (2013.04)

(56) References Cited

U.S. PATENT DOCUMENTS

| | | | |
|---|---|---|---|
| 2009/0049717 A1 | 2/2009 | Kayashima | |
| 2010/0282387 A1* | 11/2010 | Wenzel | B22F 3/115 152/209.15 |
| 2011/0247740 A1* | 10/2011 | Ohara | B29D 30/0629 152/454 |
| 2013/0068363 A1* | 3/2013 | Ikemura | B29C 33/424 152/450 |

FOREIGN PATENT DOCUMENTS

| | | | |
|---|---|---|---|
| DE | 102004010060 | * | 10/2005 |
| EP | 2028023 A2 | | 2/2009 |
| GB | 2219557 | * | 12/1989 |
| JP | 2147411 A | | 6/1990 |
| JP | 07-257111 A | | 10/1995 |
| JP | 11-301217 A | | 11/1999 |
| JP | 2000-142026 | * | 5/2000 |
| JP | 2002-192914 A | | 7/2002 |
| JP | 2007-015621 A | | 1/2007 |
| JP | 2007-320248 A | | 12/2007 |
| JP | 2009-067378 A | | 4/2009 |
| WO | 2011118856 A1 | | 9/2011 |
| WO | WO 2011/118856 | * | 9/2011 |

OTHER PUBLICATIONS

International Search Report of PCT/JP2012/084302 dated Feb. 5, 2013.
Communication dated Aug. 5, 2015 from the Russian Patent Office in counterpart application No. 2014131025.
Communication dated Jun. 29, 2015, issued by the European Patent Office in counterpart Application No. 12862443.4.
Communication dated Sep. 8, 2015, issued by the Japan Patent Office in corresponding Japanese Application No. 2011-289216.
Communication dated Nov. 2, 2015 from the State Intellectual Property Office of P.R. China issued in corresponding Chinese Application No. 201280065078.0.

* cited by examiner

TIRE AND TIRE FORMING MOLD

TECHNICAL FIELD

The present invention relates to tires and tire forming molds, and more particularly, to tires that are excellent in on-ice performance and on-snow performance, and tire forming molds used for manufacturing the same.

BACKGROUND ART

Conventionally, various contrivances have been made for improving the on-ice performance and on-snow performance of winter tires.

For example, a technology which increases edge components present in a contact patch and simultaneously improves the snow-gripping effect and the travelling performance on icy and snowy road surfaces (iced road surfaces and snowed road surfaces) of tires, by providing a plurality of sipes on each block formed on a tread portion, is proposed in JP 2002-192914 A (PTL 1).

In addition, for example, JP H11-301217 A (PTL 2) proposes a technology which uses foamed rubber as a cap rubber on a tire having a tread rubber with a so-called cap-and-base structure comprising a cap rubber and a base rubber, thereby significantly improving the drainage performance and the on-ice performance and on-snow performance of the tire.

Figure 1A:
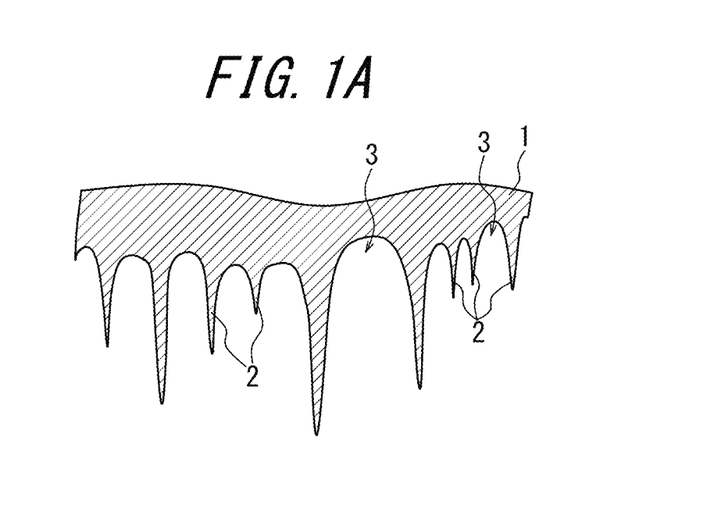
FIG. 1(a) is a schematic sectional view schematically showing the tread surface of the tread portion of a conventional tire.

Also, for example, JP 2009-67378 A (PTL 3) proposes, as is shown in FIG. 1(a), for the surface properties of the tread portion 1 of the tire, a technology which increases the roughness of the surface, increases the frictional force between the tire surface and a road surface, and improves the on-ice performance and on-snow performance of the tire, by providing protrusions 2 with a sharp-ended shape on the surface of the tread portion.

CITATION LIST

Patent Literature

PTL 1: JP 2002-192914 A
PTL 2: JP H11-301217 A
PTL 3: JP 2009-67378 A

SUMMARY OF INVENTION

Technical Problem

However, in the technology disclosed in PTL 1 which provides sipes on each block, there is a problem that if the number of sipes is increased too much, the block rigidity will be decreased and collapsing of a block may easily happen, which causes a reduction in the ground contact area and, rather, degrades the on-ice performance and on-snow performance.

In addition, in the technology disclosed in PTL 2 using foamed rubber for the cap rubber, there are cases where a reduction in the rigidity of the entire blocks is caused by usage of foamed rubber, so that the wear resistance of the tire is not always sufficient.

Figure 1B:
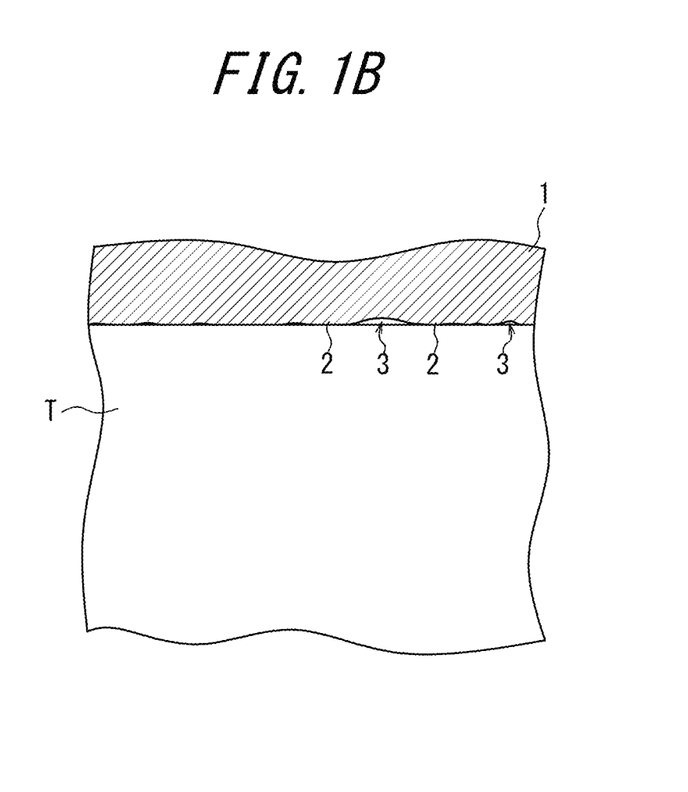
FIG. 1(b) is a schematic sectional view schematically showing the state where the tread surface of the tread portion of the tire is in contact with the road surface in the case where a load is placed upon the tire.

Further, for example, in the technology disclosed in PTL 3 which provides protrusions with a sharp-ended shape on the surface of the tread portion, due to the fact that the rigidity of the protrusion is low, there are cases where the protrusions collapse and the desirable performance cannot be obtained, particularly when a large load is placed on the tire, such as when the load on the front wheel is increased due to nose diving of the vehicle, etc. Namely, in the technology providing protrusions with a sharp-ended shape on the surface of the tread portion, there are cases that protrusions 2 collapse due to the contacting with road surface T, the volume of gaps 3 for water removing is reduced, the drainage is reduced, and consequently the desirable on-ice performance and on-snow performance may not be obtained, as is shown in FIG. 1(b). Therefore, there is still room for further improvement of the on-ice performance and on-snow performance in the technology disclosed in PTL 3. In addition, as the result of repeated study by the inventor on tires applying the technologies disclosed in PTL 1 to 3, a problem is also found that the on-ice performance and on-snow performance cannot be sufficiently obtained on those conventional tires, particularly new tires, due to the effect of chemicals attached to the tire surface during the tire production process. Therefore, there is still room for further improvement of the on-ice performance and on-snow performance of, in particular, new tires, in the technologies disclosed in PTL 1 to 3.

In addition, as the result of repeated study by the inventor on tires applying the technologies disclosed in PTL 1 to 3, a problem is also found that the on-ice performance and on-snow performance cannot be sufficiently obtained on those conventional tires, particularly new tires, though the reason is not clear. Therefore, there is still room for further improvement of the on-ice performance and on-snow performance of, in particular, new tires, in the technologies disclosed in PTL 1 to 3.

An object of the present invention is to solve the aforementioned problems, and to provide a tire with improved on-ice performance and on-snow performance and a tire forming mold used for manufacturing (forming) the same.

Solution to Problem

The inventor has intensively studied to solve the problems aforementioned.

As a result, the present inventor has completed the present invention by finding that by forming a predetermined microstructure on the tread surface of the tread portion, it is possible to suppress the reduction of the block rigidity and the drainage performance of a tire, thereby to obtain further improved on-ice performance and on-snow performance of the tire, and to allow the tire to exhibit sufficient on-ice performance and on-snow performance even when the tire is brand new.

The present invention is made based on the findings above, and the primary features thereof are summarized as follows.

The tire of the present invention is characterized in that at least a part of the tread surface of the tread portion has a surface roughness at which the roughness motif maximum length A is 5 µm or more and 100 µm or less. According to the constitution, the tread surface of the tread portion has a surface roughness at which the roughness motif maximum length is 5 µm or more and 100 µm or less, and consequently it is possible to further suppress the degradation of the block rigidity and the drainage performance, and simultaneously further improve the on-ice performance and on-snow performance of the tire sufficiently.

Namely, for the surface properties of the tread surface of the tread portion, the roughness motif maximum length A is 5 µm or more, and therefore the water-removing space may be ensured, while the roughness motif maximum length A is 100 µm or less, and therefore the frictional force between the tire and the road surface may be ensured.

Here, "roughness motif maximum length A" refers to the "roughness motif maximum length A" specified by JIS B 0631 (2000), and is measured with a microscope, etc., under no-load condition.

In addition, the tire forming mold of the present invention is a tire forming mold, which is characterized by having a tread-surface molding surface for molding the tread surface of the tread portion of the tire, and having a surface roughness at which the roughness motif maximum length A is 5 μm or more and 100 μm or less on at least a part of the tread-surface molding surface.

In this way, it is possible to form the aforementioned tire excellent in on-ice performance and on-snow performance, and at which at least a part of the tread surface of the tread portion has a surface roughness at which the roughness motif maximum length A is 5 μm or more and 100 μm or less.

Advantageous Effect of Invention

According to the present invention, it is possible to provide a tire with improved on-ice performance and on-snow performance and also a tire forming mold that can be used for forming the same.

BRIEF DESCRIPTION OF DRAWINGS

The present invention will be further described below with reference to the accompanying drawings, wherein:

FIGS. 7 (a) to (c) are other examples of the shape of a part of the tread surface of the tread portion of the tire.

DESCRIPTION OF EMBODIMENTS

The tire and the tire forming mold of the present invention is explained hereinafter. The tire of the present invention is characterized in that a predetermined microstructure is formed on at least a part of the tread surface (the surface that contacts a road surface) of the tread portion, and the tread portion has predetermined surface properties (tread surface properties). Additionally, the tire forming mold of the present invention is used for manufacturing the tire of the present invention, characterized in that the tread-surface molding surface has predetermined surface properties by forming a predetermined microstructure on the inner surface of the mold, specifically at least a part of the tread-surface molding surface for molding the tread surface of the tire.

<Tire>

Figure 2:
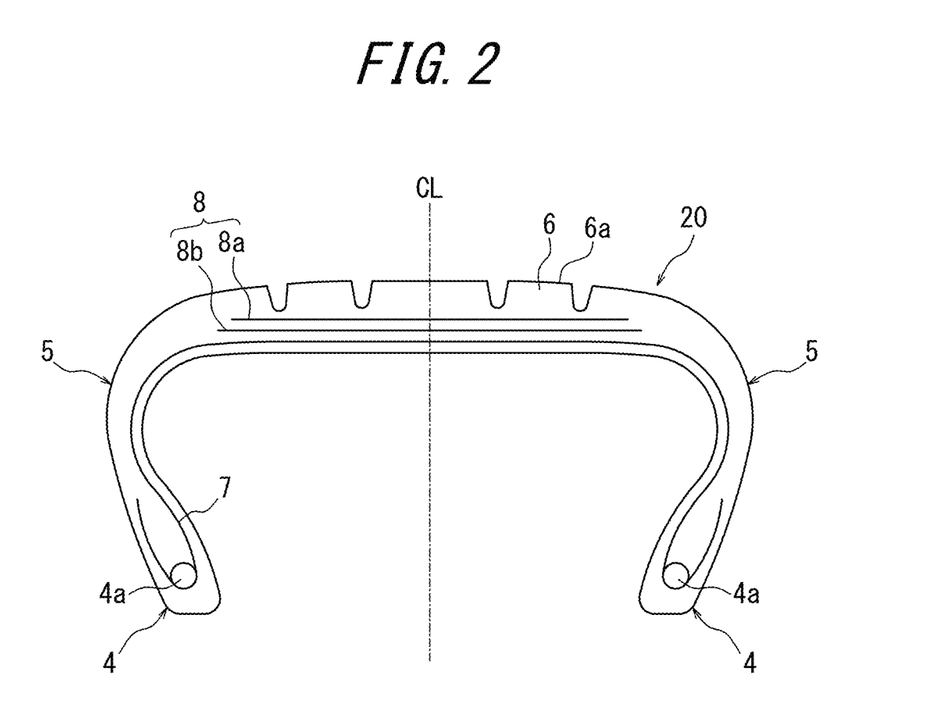
FIG. 2 is a sectional view of the tire according to an embodiment of the present invention taken along the tire width direction.

FIG. 2 is a sectional view of the tire according to an embodiment of the present invention taken along the tire width direction.

As is shown in FIG. 2, a tire 20 according to the embodiment of the present invention has a pair of bead portions 4, a pair of sidewall portions 5, each extending outwardly in the tire radial direction from each bead portion 4, and a tread portion 6 extending between the sidewall portions 5.

In addition, the tire 20 of the embodiment has a carcass 7 toroidally extending between a pair of bead cores 4a which are embedded in the pair of bead portions 4, and a belt 8 including belt layers 8a and 8b which are disposed on the outside of the carcass 7 in the tire radial direction. Further, a tread rubber made from non-foamed rubber is disposed on the outside of belt 8 in the tire radial direction.

Figure 3A:
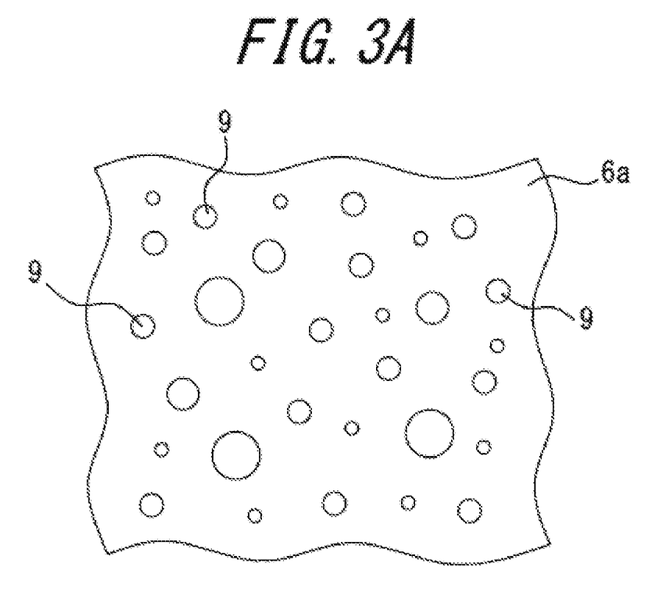
FIG. 3 schematically shows an enlarged view of the shape of a part of the tread surface of the tread portion of the tire shown in FIG. 2, where (a) is a plan view and (b) is a sectional view taken along the tire width direction.
Figure 3B:
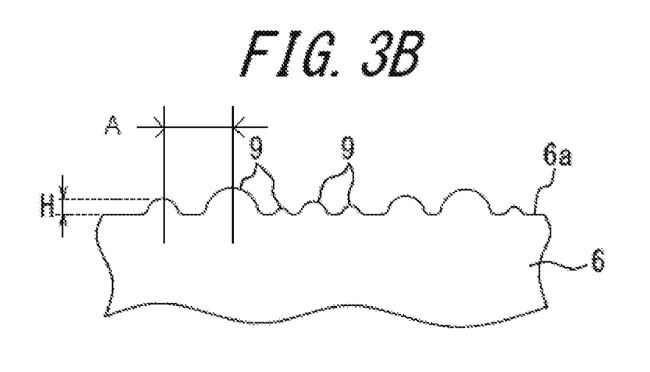
Figure 4:
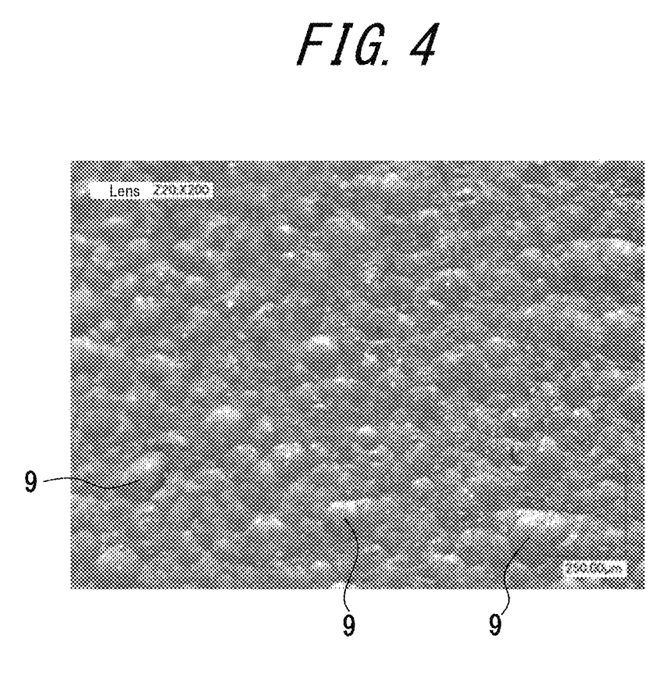
FIG. 4 shows an SEM image (Scanning Electron Microscope image) of the tread surface of the tread portion of an example of the tire of the present invention.

Here, micro protrusions with a predetermined shape are formed on at least a part of the tread surface of the tread portion (in this embodiment, the entire tread surface) of the tire 20. Specifically, according to an enlarged plan view of a surface 6a of the tread portion 6 shown in FIG. 3(a), an enlarged view of the tread portion 6 on the surface 6a side along the tire width direction shown in FIG. 3(b), and an SEM image of a part of the tread surface shown in FIG. 4, the tire according to this embodiment has a large number of micro protrusions 9, each being convex outwardly in the tire radial direction (of hemispherical shape, in the illustrated example) formed on the entire tread surface 6a of the tread portion, and at least a part of the tread surface 6a of the tread portion has a surface roughness at which the roughness motif maximum length A is 5 μm or more and 100 μm or less.

Figure 7A:
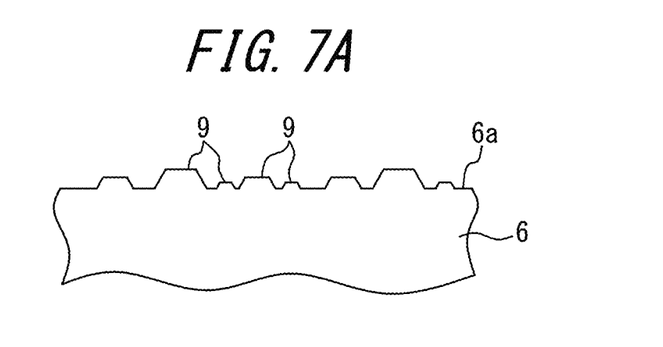
Figure 7B:
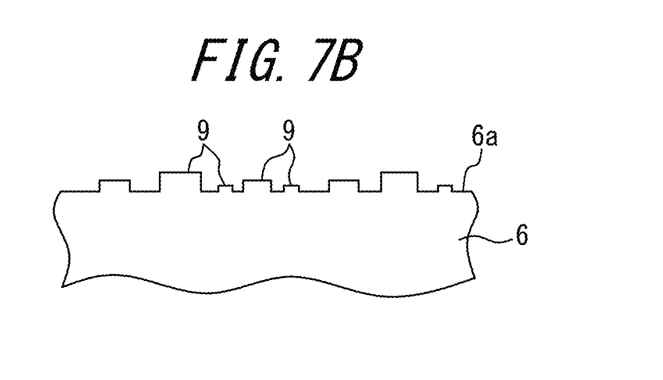
Figure 7C:
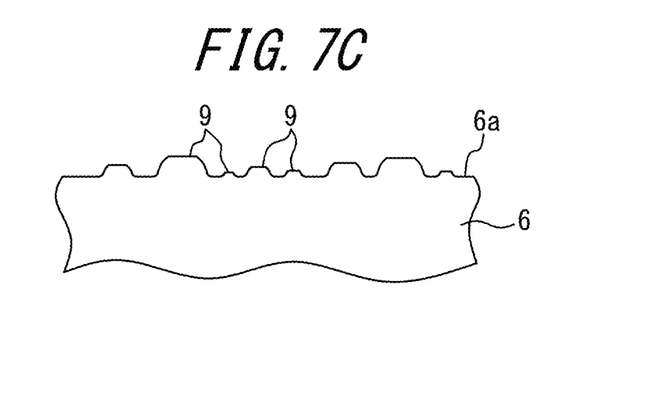

Note that although FIG. 3 shows a case that the protrusions 9 are hemispherical protrusions, in the tire of the present invention, the protrusions may be of various shapes, such as trapezoidal cross section shapes as shown in FIG. 7(a), including truncated conical shape and truncated pyramidal shape, rectangular cross section shapes as shown in FIG. 7(b), including cylindrical shape and prismatic shape, and truncated hemispherical shapes as shown in FIG. 7(c).

Additionally, in the tire 20, the tread surface of the tread portion has a surface roughness at which the roughness motif maximum length A is 5 μm or more and 100 μm or less, and consequently it is possible to suppress the degradation of the block rigidity and the drainage performance, and simultaneously further improve the on-ice performance and on-snow performance of the tire sufficiently.

Namely, in the tire 20, for the surface properties of the tread surface, the roughness motif maximum length A is 5 μm or more, and therefore the water-removing space may be ensured, while the roughness motif maximum length A is 1001 μm or less, and therefore the frictional force between the tire and the road surface may be ensured.

Further, in the tire 20, the suppression of the degradation of the drainage performance and the improvement of the on-ice performance and on-snow performance is accomplished by forming micro protrusions 9 having a predetermined shape, and therefore there is no need to form an excessive number of sipes, or utilize foamed rubber, etc.

In addition, the tire 20 may exhibit sufficient on-ice performance and on-snow performance even when the tire is new (in unused state), although the reason is not clear.

Therefore, with the tire 20, it is possible to further improve the on-ice performance and on-snow performance of the tire even when it is new, by suppressing the degradation of the block rigidity and the drainage performance.

Here, for the tire 20, it is more preferable that the part with protrusions 9 formed thereon has surface properties having a surface roughness at which the roughness motif maximum length A is 201 μm or more and 80 μm or less, for the same reason.

In addition, for the tire 20, it is preferable that the protrusions 9 have a hemispherical shape. This is because that if the protrusions 9 have a hemispherical shape, the protrusions 9 are unlikely to collapse and the drainage performance may be ensured.

Further, for the tire 20, it is preferable that the height H of the protrusions 9 formed on the tread surface of the tread portion is 1 to 501 μm. This is because that if the height H is set to be 1 μm or more, it is possible to improve the drainage performance by ensuring a sufficient volume of gaps among the protrusions 9. In addition, if the height H of the protrusions 9 is set to be 50 μm or less, it is possible to sufficiently ensure the drainage performance by increasing the rigidity of the protrusions 9.

Protrusion height refers to the distance along the tire radial direction between a first imaginary plane perpendicular to a tire radial direction line extending across the distal ends of the protrusions (the outer ends in the tire radial direction), and a second imaginary plane closest to the first imaginary plane among the imaginary planes contacting the outer contour line of the protrusions 9 and perpendicular to the tire radial direction line. Note that the "protrusion number" and "protrusion height" of the present invention may be measured, for example, by enlarging the tread surface of the tread with an SEM or a microscope.

Additionally, it is preferable that for the tire of the present invention, protrusions with a height H of more than 201 μm are formed in a number density of 80/mm$^2$ or more on at least a part of the tread surface of the tread portion.

In this way, it is possible to further suppress the degradation of block rigidity and drainage performance, and simultaneously improve the on-ice performance and on-snow performance of tires.

Namely, for the surface properties of the tread surface of the tread portion, protrusions having a height of 201 μm or more are formed, and therefore it is possible to ensure the water-removing space between the protrusions, while protrusions having a height of 201 μm or more are formed in a number density of 80/mm$^2$ or more, and therefore it is possible to ensure the ground contact area of the protrusions.

Further, for the same reason, it is more preferable that the part with protrusions 9 with a height of more than 201 μm formed thereon has a number density of protrusions of 150/mm$^2$ or more. It is more preferable that the number density of the protrusions with a height of more than 20 μm is 150/mm$^2$ or more and 250/mm$^2$ or less.

Additionally, it is preferable that protrusions with a preferable protrusion height of more than 301 μm are formed in a number density of 100/mm$^2$ or more. Additionally, it is preferable that the protrusion height is less than 501 μm. This is because that if the protrusion height is 501 μm or more, there is a possibility that the protrusion rigidity is degraded, and in the case where a large load is placed on the tire, protrusions may collapse and fail to provide braking force. Here, the "protrusion number" and "protrusion height" of the present invention may be measured, for example, by enlarging the tread surface of the tread portion with an SEM or a microscope.

Further, it is preferable that the tire of the present invention has a surface roughness at which the mean height of profile elements Rc is 1 μm or more and 50 μm or less, on at least a part of the tread surface of the tread portion.

In this way, it is possible to further suppress the degradation of block rigidity and drainage performance, and simultaneously improve the on-ice performance and on-snow performance of tires. Additionally, by setting the surface roughness of the tread surface of the tread portion to have a mean height of profile elements Rc of 1 μm or more and 50 μm or less, it is possible to further suppress the degradation of the block rigidity and the drainage performance, and simultaneously further improve the on-ice performance and on-snow performance of the tire sufficiently. Namely, for the surface properties of the tread surface of the tread portion, by setting the mean height of profile elements Rc to be 1 μm or more, therefore the water-removing space may be ensured, while the mean height of profile elements Rc is 50 μm or less, therefore the protrusion rigidity may be ensured. Further, it is more preferable that the part of the tread surface has surface properties having a surface roughness at which the mean height of profile elements Rc is 10 μm or more and 40 μm or less, for the same reason.

As used herein, the term "mean height of profile elements Rc" refers to the "mean height of profile elements Rc" specified by JIS B 0601 (2001). As the measuring condition, Rc may be determined by measuring the heights of those peaks existing in a unit length (1 mm), and averaging the same excluding the heights of the peaks included in the range of 10% higher and lower than a height reference.

Additionally, it is preferable that the tire of the present invention has a surface roughness at which the maximum profile peak height Rp is 5 μm or more and 70 μm or less on at least a part of the tread surface of the tread portion.

In this way, it is possible to further suppress the degradation of block rigidity and drainage performance, and simultaneously further improve the on-ice performance and on-snow performance of tires. Additionally, by setting the surface roughness of the tread surface of the tread portion to have a maximum profile peak height Rp of 5 μm or more and 70 μm or less, it is possible to further suppress the degradation of the block rigidity and the drainage performance, and simultaneously further improve the on-ice performance and on-snow performance of the tire sufficiently. Namely, for the surface properties of the tread surface of the tread portion, by setting the maximum profile peak height Rp to be 5 μm or more, the water-removing space may be ensured, while by setting the maximum profile peak height Rp to be 70 μm or less, the protrusion rigidity may be ensured. Further, it is more preferable that the part with protrusions formed thereon has a profile element maximum peak height Rp is 101 μm or more and 40 μm or less, for the same reason.

Here, "maximum profile peak height Rp" refers to the "maximum profile peak height Rp" specified by JIS B 0601 (2001). Note that Rp may be evaluated by measuring the peak height existing in a unit length (1 mm).

Here, it is preferable that the ten-point average roughness Rz of the tread surface of the tread portion of the tire with protrusions with a hemispherical shape formed thereon is 1.0 to 50 μm.

The reason is that by setting Rz to be 1.0 μm or more, the gaps for water removing may be ensured, while by setting Rz to be 50 μm or less, the contacting area with the road surface may be ensured, and thereby it is possible to further improve the on-ice performance and on-snow performance of the tire.

Here, "ten-point average roughness Rz" refers to a value measured in accordance with the provisions of JIS B0601 (1994), based on the reference length of 0.8 mm, and the evaluation length of 4 mm.

In addition, it is preferable that the mean spacing S of local peaks of the protrusions 9 formed on the tread surface of the tread portion of the tire is set to be 5.0 to 100 μm.

The reason is that by setting spacing S to be 5.0 μm or more, the gaps for water removing may be ensured, while by setting spacing S to be 100 μm or less, the contacting area with the road surface may be ensured, and thereby it is possible to further improve the on-ice performance and on-snow performance of the tire.

As used herein, the term "mean spacing of local peaks" refers to a value measured in accordance with the provisions of JIS B0601 (1994), based on the reference length of 0.8 mm and the evaluation length of 4 mm.

Additionally, the aforementioned tire is not particularly limited and may be manufactured with the tire forming mold as follows. Further, the forming of the tire utilizing the tire forming mold as follows may be performed with ordinary methods.

<Tire Forming Mold>

Figure 5:
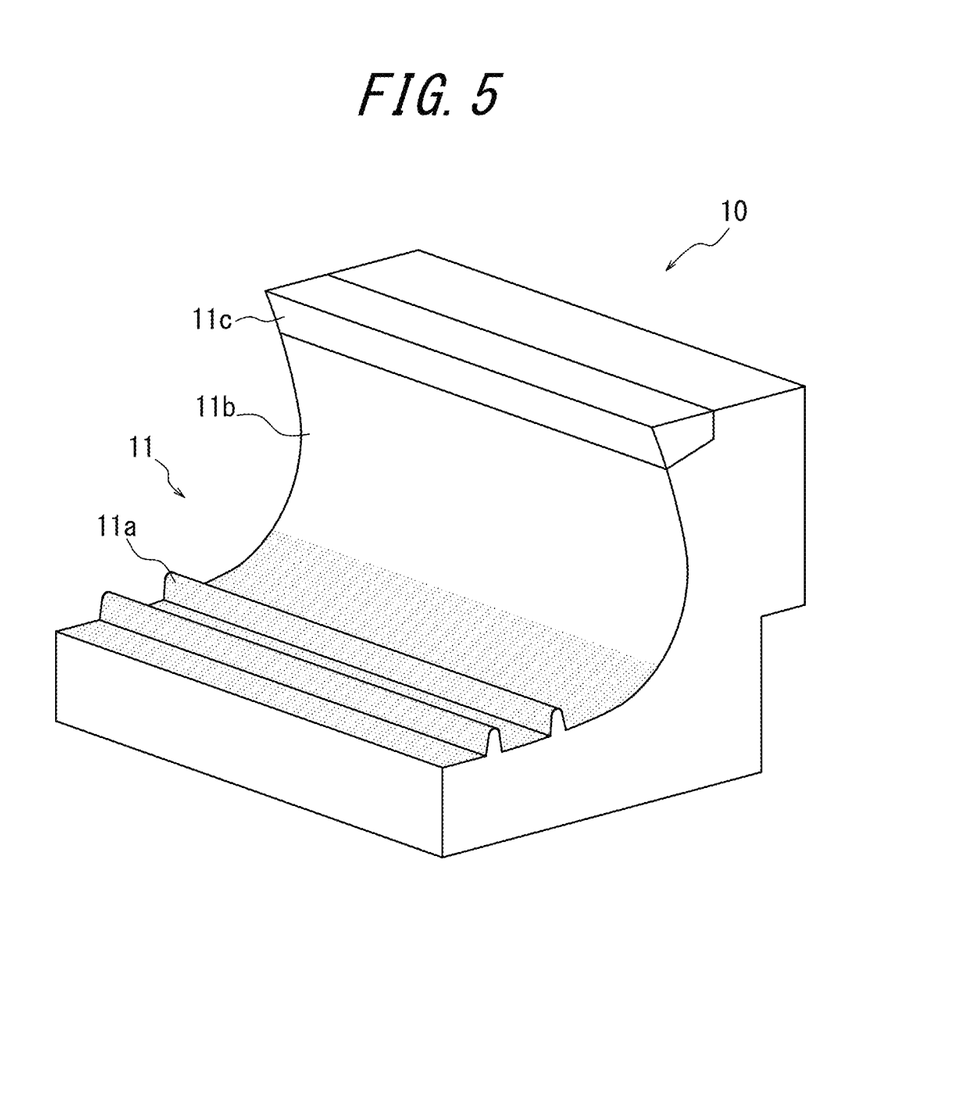
FIG. 5 is a schematic perspective view schematically showing a part of the tire forming mold according to an embodiment of the present invention.

FIG. 5 is a schematic partial perspective view showing a part of the tire forming mold utilized in forming the tire of the present invention.

As is shown in FIG. 5, the mold 10 has a molding surface 11 for the vulcanization forming of the tire.

The molding surface 11 has a tread-surface molding surface 11a for molding the tread surface of the tread portion, and according to the example as shown, it also has a sidewall-portion molding surface 11b for molding the outside surface of a sidewall portion, and a bead-portion molding surface 11c for molding the outside surface of the bead portion.

The molding surface 11 is not particularly limited, and may be formed with aluminum, for example.

Figure 6A:
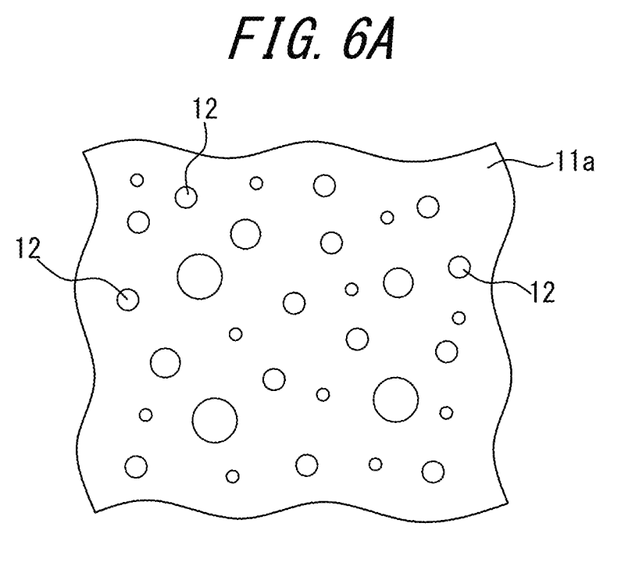
FIG. 6 schematically shows an enlarged view of the shape of a part of the tread-surface molding surface of the tire forming mold shown in FIG. 5, where (a) is a plan view and (b) is a sectional view taken along the width direction.
Figure 6B:
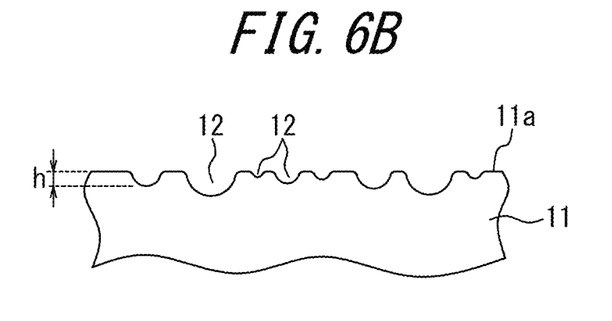

The tread surface of the tread portion of the tire of the present invention having the aforementioned surface properties may be formed with a tire vulcanization mold 10 comprising the tread-surface molding surface 11a having the aforementioned surface properties. Specifically, as shown in the enlarged plan view of the tread-surface molding surface 11a in FIG. 6(a) and in the enlarged cross-sectional view taken along the width direction of the mold 10 on the tread-surface molding surface 11a side in FIG. 6(b), the tire-forming mold 10 according to the present embodiment has a large number of recesses 12 on the entire tread-surface molding surface 11a for molding the tread surface of the tread portion of the tire. Additionally, at least a part of the tread-surface molding surface (in the illustrated example, the entire tread-surface molding surface) has a surface roughness at which the roughness motif maximum length A is 5 μm or more and 100 μm or less. Further, although FIG. 6 illustrates a case that recesses 12 are recesses with a hemispherical shape, recesses 12 of the mold of the present invention may also be recesses of truncated hemispherical shape, truncated conical shape, truncated pyramidal shape, cylindrical shape or prismatic shape.

Namely, in the tire vulcanization process utilizing the mold 10, the surface shape of the tread-surface molding surface 11a of mold 10 is transferred as the surface shape of the tread surface of the tread portion of the tire. Additionally, a large number of protrusions 9 are formed on the tread surface of the tread portion of the manufactured tire, and the tread surface of the tread portion has a surface roughness at which the roughness motif maximum length A is 5 μm or more and 100 μm or less. Therefore, it is possible to form a tire excellent in on-ice performance and on-snow performance.

The method for molding the tread-surface molding surface 11a of mold 10 will be explained hereinafter.

As is shown in FIG. 7, the aforementioned tread-surface molding surface 11a may be formed via a blast material blasting process whereby blast materials of a particular shape are blasted and forced to impact the molding surface. Additionally, the tire forming mold obtained via the blast material blasting process has a tread-surface molding surface having a large number of the aforementioned recesses 12, and at least a part of the tread-surface molding surface has a surface roughness at which the roughness motif maximum length A is 5 μm or more and 100 μm or less, and consequently the tread surface of the tread portion of the tire vulcanization formed by utilizing the mold has a surface roughness at which the roughness motif maximum length A is 5 μm or more and 100 μm or less as described above.

Here, in the blast material blasting process, it is preferable that the aforementioned tread-surface molding surface 11a (entirely or partially) is formed by blasting spherical blast materials with a sphericity of 15 μm or less and forcing the same to impact the tread-surface molding surface.

This is because that by setting the sphericity of the blast materials to be 15 μm or less, recesses with desirable properties may be formed on the tread-surface molding surface of the mold, and it is possible to shape the tread surface of the tread portion of the tire formed by utilizing the mold into a desirable surface shape.

Further, it is more preferable that the sphericity of the blast materials herein is set to be 10 μm or less.

This is because that a large number of recesses with desirable properties may be easily formed on the tread-surface molding surface of the mold by setting the sphericity of the blast materials to be 10 μm or less, and consequently, it is possible to form tires with further improved on-ice performance and on-snow performance by forming a large number of protrusions with a desirable shape on the tread surface of the tread portion of the tire formed by utilizing the mold.

In addition, it is more preferable that the sphericity of the blast materials herein is set to be 5 μm or less.

This is because that in this way, recesses with desirable properties may be more easily formed on the tread-surface molding surface of the mold.

Here, it is preferable that the average particle size of the blast materials utilized in the blast material blasting process is set to be 10 μm to 1 mm.

This is because that by setting the average particle size of the blast materials to be 10 μm or more, a mold having recesses of desirable shape on its tread-surface molding surface may be obtained easily, and in the blast material blasting process, it is possible to suppress the splashing around of the blast materials in the case of high-pressure blasting, while by setting the average particle size of the blast materials to be 1 mm or less, it is possible to suppress the rapid wearing of the mold surface.

For the same reason, it is more preferable that the average particle size of the blast materials is set to be 20 μm to 0.7 mm, still more preferably 30 μm to 0.5 mm.

As used herein, the term "average particle size" refers to the value obtained by imaging blasting materials with SEM, then randomly taking out 10 blasting materials therefrom, obtaining the average value of the diameter of the inscribed circle and the diameter of the circumscribed circle of each blast material, and averaging the results of the 10 blast materials.

In addition, it is preferable that the Mohs hardness of the blast materials is set to be 2 to 10.

This is because that by setting the Mohs hardness of the blast materials to be 2 or more, a mold having recesses of desirable shape on its tread-surface molding surface may be obtained more easily. On the other hand, by setting the Mohs hardness of the blast materials to be 10 or less, the mold may be less prone to rapid deterioration.

For the same reason, it is more preferable that the Mohs hardness of the blast materials is set to be 3.0 to 9.0, still more preferably 5.0 to 9.0.

In addition, it is preferable that the Mohs hardness of the tread-surface molding surface of the tire forming mold is set to be 2.0 to 5.0, and that the difference between the Mohs hardness of the tread-surface molding surface of the tire forming mold and the blast materials is set to be 3.0 to 5.0.

Additionally, it is preferable that the specific gravity of the blast materials is set to be 0.5 to 20.

This is because that by setting the specific gravity of the blast materials to be 0.5 or more, the operability may be improved by suppressing the splashing around of the blast materials in the blasting process. On the other hand, by setting the specific gravity of the blast materials to be 20 or less, it is possible to reduce the energy needed for accelerating the blast materials, and to suppress the rapid wearing of the mold.

For the same reason, it is more preferable that the specific gravity of the blast materials is set to be 0.8 to 18, still more preferably 1.2 to 15.

Here, the material of the blast materials is not particularly limited, and it is preferable to utilize, for example, gyricon, iron, cast steel or ceramics.

In addition, in the blast material blasting process, it is preferable that the blast materials are blasted with high-pressure air of 100 to 1000 kPa onto the tread-surface molding surface of the aforementioned mold for 30 seconds to 10 minutes.

This is because that by blasting the blast materials for 30 seconds or more under a pressure of 100 kPa or more, it is possible to shape the tread-surface molding surface into the aforementioned desirable shape thoroughly, while by blasting the blast materials for 10 minutes or less under a pressure of 1000 kPa or less, it is possible to suppress the damage to the tread-surface molding surface.

Further, it is preferable that the blasting speed of the blast materials is set to be 0.3 to 10 (m/s), more preferably 0.5 to 7 (m/s), by adjusting the specific gravity and blasting pressure of the blasting materials.

In this case, it is preferable that the distance between the nozzle for blasting the blast materials and the tire forming mold is set to be 50 to 200 (mm). Here, the aforementioned blasting time of the blast materials refers to the blasting time for a single mold, for example, in the case that a single tire is formed utilizing 9 molds, it is preferable that blast materials are blasted for 270 seconds to 90 minutes in total onto the tread-surface molding surface of the 9 molds for forming a single tire.

In addition, the blasting of the blast materials onto the tread-surface molding surface of a single mold may be performed by the operator displacing the blasting position while considering the shape of the mold, etc. In this way, it is possible to blast the blast materials more uniformly.

Here, it is preferable that the tread-surface molding surface of the mold has surface properties having a surface roughness at which the roughness motif maximum length A is 20 µm or more and 80 µm or less. This is because that it is possible to mold a tread surface of the tread portion of the formed tire with surface properties such that the roughness motif maximum length A is 20 µm or more and 80 µm or less, and it is possible to form a tire excellent in tire on-ice performance and on-snow performance.

In addition, it is possible to control the roughness motif maximum length A of recesses 12 by adjusting the particle size of the blast materials. Specifically, if the blasting speed of the blast materials is increased, the roughness motif maximum length A may be increased.

In addition, in the mold 10, it is preferable that the shape of each recess 12 is hemispherical. This is because that by shaping each recess 12 into a hemispherical shape, it is possible to form protrusions 9 of hemispherical shape on the tread surface of the tread portion. Further, it is possible to control the shape of recesses 12 by adjusting the particle size, the blasting speed and the blasting angle of the blast materials.

Further, in the mold 10, it is preferable that the depth h of each recess 12 is set to be 1 to 50 µm. By setting the depth h of each recess 12 to be 1 to 50 µm, it is possible to form protrusions 9 with a height of 1 to 50 µm on the tread surface of the tread portion of the tire. Further, it is possible to control the depth h of recesses 12 by adjusting the blasting speed. Specifically, if the blasting speed is increased, the depth h may be increased.

Here, the depth of each recess 12 refers to the distance along the radial direction between a third imaginary plane perpendicular to a radial direction line extending across the deepest portions (the inner ends in the radial direction) of the recesses 12 and a fourth imaginary plane closest to the third imaginary plane among the imaginary planes contacting the outer contour line of the recesses 12 and perpendicular to the radial direction line. Note that the term "radial direction" refers to a direction corresponding to the radial direction of the toroidal tread-surface molding surface, namely a direction corresponding to the tire radial direction of the tire formed by utilizing the mold 10.

Further, the depth of recesses 12 may be measured with an SEM or a microscope.

In addition, the tire forming mold of the present invention is a tire forming mold, having a tread-surface molding surface for molding the tread surface of the tread portion of the tire, and it is preferable that recesses with a recess depth h of more than 20 µm are formed in a number density of 80/mm$^2$ or more on at least a part of the tread-surface molding surface.

This is because that in this way, it is possible to form the aforementioned tire excellent in on-ice performance and on-snow performance, and at which protrusions with a protrusion height of more than 20 µm are formed in a number density of 80/mm$^2$ or more on at least a part of the tread surface of the tread portion.

Similarly, to obtain more desirable surface properties of the tread surface of the tread portion, it is preferable that the number density of recesses with a recess depth of more than 20 µm is 150/mm$^2$ or more. It is more preferable that the number density of the recesses with a recess depth of more than 20 µm is 150/mm$^2$ or more and 250/mm$^2$ or less. Additionally, it is preferable that recesses with a preferable recess depth of more than 30 µm are formed in a number density of 100/mm$^2$ or more. In addition, it is preferable that the recess height is less than 50 µm.

Further, it is possible to control the number density of the recesses on the tread-surface molding surface of the mold by adjusting the particle size and particle number of the blasting materials. Specifically, if the particle size of the blast materials is increased, the number density may be increased. In addition, if the particle size of the blast materials is increased, the number density may be reduced. In addition, it is possible to control the recess depth of the tread-surface molding surface of the mold by adjusting the blasting speed of the blast materials. Specifically, if the blasting speed of the blast materials is increased, the recess depth may be increased.

Here, the "recess number density" and "recess depth" of the present invention may be measured, for example, by enlarging the tread surface of the tread with an SEM or a microscope.

Further, it is preferable that the tire of the present invention has a surface roughness at which the mean height of profile elements Rc is 1 μm or more and 50 μm or less, on at least a part of the tread surface of the tread portion.

In this way, it is possible to further suppress the degradation of block rigidity and drainage performance, and simultaneously further improve the on-ice performance and on-snow performance of tires. Additionally, by setting the surface roughness of the tread surface of the tread portion to have a mean height of profile elements Rc of 1 μm or more and 50 μm or less, it is possible to further suppress the degradation of the block rigidity and the drainage performance, and simultaneously further improve the on-ice performance and on-snow performance of the tire sufficiently. Namely, for the surface properties of the tread surface of the tread portion, by setting the mean height of profile elements Rc to be 1 μm or more, the water-removing space may be ensured, while by setting the mean height of profile elements Rc to be 50 μm or less, the protrusion rigidity may be ensured. Further, it is more preferable that the part has surface properties having a surface roughness at which the mean height of profile elements Rc is 10 μm or more and 40 μm or less, for the same reason.

Here, "mean height of profile elements Rc" refers to the "mean height of profile elements Rc" specified by JIS B 0601 (2001). As the measuring condition, Rc may be determined by measuring the heights of the peaks existing in a unit length (1 mm), and averaging the same excluding the heights of those peaks included in the range of 10% higher and lower than a height reference.

In addition, the tire forming mold of the present invention is a mold for tire forming, having a tread-surface molding surface for molding a tread surface of the tread portion of the tire, and it is preferable that at least a part of the tread-surface molding surface has a surface roughness at which the maximum profile peak height Rp is 5 μm or more and 70 μm or less.

This is because that in this way, it is possible to form the aforementioned tire excellent in on-ice performance and on-snow performance, in which at least a part of the tread surface of the tread portion has a surface roughness at which the maximum profile peak height Rp is 5 μm or more and 70 μm or less.

Here, it is more preferable that the tread-surface molding surface of the mold has surface properties having a surface roughness at which the maximum profile peak height Rp is 10 μm or more and 40 μm or less. This is because that it is possible to mold a tread surface of the tread portion of the formed tire with surface properties such that the maximum profile peak height Rp is 10 μm or more and 40 μm or less, and it is possible to form a tire excellent in on-ice performance and on-snow performance.

It is possible to control the maximum profile peak height Rp of the tread-surface molding surface by adjusting the blasting speed. Specifically, if the blasting speed is increased, the maximum profile peak height Rp may be increased.

Here, it is preferable that the ten-point average roughness Rz of the tread-surface molding surface of the mold is 1.0 to 50 μm. This is because that it is possible to form a tire with a tread surface of the tread portion having a ten-point average roughness Rz of 1.0 to 50 μm.

Note that by setting the average particle size of the blast materials used in the blast material blasting process to be 50 to 400 μm, it is possible to obtain a tire-forming mold provided with a tread-surface molding surface having a ten-point average roughness Rz in the aforementioned range.

In addition, it is preferable that the recesses of the tread-surface molding surface of the mold have a mean spacing of local peaks of 5.0 to 100 μm. This is because that it is possible to form a tire with the protrusions formed on the tread surface of the tread portion having a mean spacing S of local peaks of 5.0 to 100 μm.

Further, by setting the average particle size of the blast materials utilized in the blast material blasting process to be 50 to 400 μm, it is possible to obtain a tire forming mold including a tread-surface molding surface having a mean spacing S in the aforementioned range.

EXAMPLES

The present invention will be explained in further detail below according to examples, although the present invention is not limited to the disclosed examples.

(Manufacture of Tire Forming Mold)

Tire forming molds 1 to 4 having tread-surface molding surfaces with surface properties as shown in Table 1 were manufactured by blasting (ceramic-based) blast materials to the tread-surface molding surfaces of tire forming molds made from aluminum, while changing the blasting conditions (such as blasting pressure and blasting speed). Further, the surface properties of the tread surfaces of the manufactured molds were measured with an SEM and a microscope.

TABLE 1

|  | Mold 1 | Mold 2 | Mold 3 | Mold 4 |
| --- | --- | --- | --- | --- |
|  | Conventional example | Comparative Example | Example | Example |
| Presence/absence of recesses | Absence | Presence | Presence | Presence |
| Recess shape | — | Hemisphere | Hemisphere | Hemisphere |
| Roughness motif length A [μm] | — | 110 | 30 | 30 |
| Protrusions with a height of more than 20 μm [/mm$^2$] | — | 60 | 180 | 140 |
| Rc [μm] | — | 60 | 20 | 50 |
| Rp [μm] | — | 70 | 20 | 50 |

(Manufacture of Tire)

Tires 1 to 4 of tire size 205/55R16 were manufactured according to ordinary methods, by utilizing the manufactured tire forming molds 1 to 4, respectively. Additionally, the surface properties of the tread surfaces of the tread portion of the manufactured tires were measured by utilizing an SEM and a microscope. The results are as shown in Table 2.

In addition, the on-ice performance and on-snow performance of each manufactured tire were evaluated with the evaluation method as follows. The results are as shown in Table 2.

<On-ice Performance>

As soon as each tire was manufactured, the tire was mounted on an approved rim, filled with a normal internal pressure specified by JATMA and installed onto a vehicle. Then, the on-ice friction coefficient was measured under the conditions of 4.3 KN load on each front wheel and a speed of 30 km/h on icy road. The on-ice friction coefficient of each tire was evaluated, with a score of 100 representing the on-ice friction coefficient of tire 1. The results are as shown in Table 2. The larger the value, the higher the on-ice friction coefficient is and the more excellent the on-ice performance is, as is shown in Table 2.

<On-snow Performance>

As soon as each tire was manufactured, the tire was mounted on an approved rim, filled with a normal internal pressure specified by JATMA and installed onto a vehicle. Additionally, the on-snow friction coefficient was measured under the conditions of 4.3 KN load on each front wheel and a speed of 30 km/h on snowy road. The on-snow friction coefficient of each tire was evaluated, with a score of 100 representing the on-snow friction coefficient of tire 1. The results are as shown in Table 2. The larger the value, the higher the on-snow friction coefficient is and the more excellent the on-snow performance is, as is shown in Table 2.

TABLE 2

|  | Tire 1 | Tire 2 | Tire 3 | Tire 4 |
| --- | --- | --- | --- | --- |
|  | Conventional Example | Comparative Example | Example | Example |
| Presence/absence of protrusions | Absence | Presence | Presence | Presence |
| Protrusion shape | — | Hemisphere | Hemisphere | Hemisphere |
| Roughness motif length A [μm] | — | 110 | 30 | 30 |
| Protrusions with a height of more than 20 μm [/mm$^2$] | — | 60 | 180 | 140 |
| Re [μm] | — | 60 | 20 | 50 |
| Rp [μm] | — | 70 | 20 | 50 |
| On-ice performance | 100 | 96 | 115 | 110 |
| On-snow performance | 100 | 96 | 112 | 108 |

It can be understood that comparing to tires according to the comparative example and the conventional example, the tire according to the examples of the present invention is more excellent in on-ice performance and on-snow performance, as is shown in Table 2.

INDUSTRIAL APPLICABILITY

According to the present invention, it is possible to provide a tire with improved on-ice performance and on-snow performance and also a tire forming mold that can be used for forming the same.

REFERENCE SIGNS LIST 1 tread portion
2 protrusion
3 gap
4 bead portion
4a bead core
5 sidewall portion
6 tread portion
7 carcass
8 belt
8a, 8b belt layer
9 protrusion
10 mold
11 molding surface
11a tread-surface molding surface
11 sidewall-portion molding surface
11c bead-portion molding surface
12 recess
20 tire
T road surface

The invention claimed is:

1. A tire comprising a tread portion having a tread surface, wherein at least a part of the tread surface of the tread portion has protrusions having a hemispherical shape and has a surface roughness formed by the protrusions at which a roughness motif maximum length A specified by JIS B 0631 (2000) is 5 μm or more and 100 μm or less, wherein a ten-point average roughness Rz specified by JIS B0601 (1994) of the tread surface of the tread portion of the tire is 1.0 to 50 μm.

2. A tire forming mold comprising a tread-surface molding surface for molding a tread surface of a tire, wherein at least a part of the tread-surface molding surface has recesses with a hemispherical shape and has a surface roughness formed by the recesses at which a roughness motif maximum length A specified by JIS B 0631 (2000) is 5 μm or more and 100 μm or less, wherein a ten-point average roughness Rz specified by JIS B0601 (1994) of the tread-surface molding surface of the mold is 1.0 to 50 μm.

3. The tire according to claim 1, wherein the protrusions with a height H of more than 20 μm are formed in a number density of 80/mm$^2$ or more on at least a part of the tread surface of the tread portion.

4. The tire forming mold according to claim 2, wherein the recesses with a recess depth h of more than 20 μm are formed in a number density of 80/mm$^2$ or more on at least a part of the tread-surface molding surface.

5. The tire according to claim 1, wherein a mean spacing S specified by JIS B0601 (1994) of local peaks of the protrusions formed on the tread surface of the tread portion of the tire is set to be 5.0 to 100 μm.

6. The tire forming mold according to claim 2, wherein the recesses of the tread-surface molding surface of the mold have a mean spacing of local peaks specified by JIS B0601 (1994) of 5.0 to 100 μm.

7. A method of manufacturing the tire forming mold of claim 2, the method comprising;

blasting blast materials to the tread-surface molding surfaces, wherein a sphericity of the blast materials is 15 μm or less.

8. A method of manufacturing the tire forming mold of claim 2, the method comprising;

blasting blast materials to the tread-surface molding surface, wherein an average particle size, where a value of the average particle size obtained by imaging blasting materials with SEM, then randomly taking out ten (10) blasting materials therefrom, obtaining the average value of a diameter of an inscribed circle and a diameter of a circumscribed circle of each blast material, and averaging results of the ten (10) blasting materials of the blast materials is set to be 10 μm to 1 mm.

9. A method of manufacturing the tire forming mold of claim 2, comprising;

blasting blast materials to the tread-surface molding surfaces, wherein Mohs hardness of the blast materials is set to be 2 to 10.

10. A method of manufacturing the tire forming mold of claim 2, comprising;
   blasting blast materials to the tread-surface molding surfaces,
   wherein a specific gravity of the blast materials is set to be 0.5 to 20.

* * * * *